United States Patent [19]

Stoller

[11] 4,456,463

[45] Jun. 26, 1984

[54] AMMONIA STABILIZED HIGH ANALYSIS LIQUID FERTILIZERS

[75] Inventor: Jerry H. Stoller, Bunkerhill, Tex.

[73] Assignee: Stoller Enterprises, Inc., Houston, Tex.

[21] Appl. No.: 434,521

[22] Filed: Oct. 15, 1982

[51] Int. Cl.³ ............................................... C05C 9/00
[52] U.S. Cl. ........................................ 71/29; 71/64.1
[58] Field of Search ...................... 71/29, 20, 30, 119, 71/34, 36, 51, 64.1, 43

[56] References Cited

U.S. PATENT DOCUMENTS

| | | | |
|---|---|---|---|
| 2,770,538 | 11/1956 | Vierling | 71/30 |
| 3,586,495 | 6/1971 | Bauwens et al. | 71/29 |
| 3,723,086 | 3/1973 | Poynor et al. | 71/29 |
| 4,315,763 | 2/1982 | Stoller et al. | 71/29 |

Primary Examiner—Delbert E. Gantz
Assistant Examiner—A. Pal
Attorney, Agent, or Firm—Kenneth H. Johnson

[57] ABSTRACT

High analysis non-ammoniated liquid fertilizers comprising the reaction product of urea and phosphoric acid having a pH between 1.5 and 4 and optionally containing the reaction product of urea and sulfuric acid, various trace including those normally found as contaminants in wet process phosphoric acid, potash and gelling agents, said fertilizers being further characterized as having total analysis of N, $P_2O_5$ and $K_2O$ of at least 25 weight percent and preferably 30 weight percent or greater, stabilized against decomposition of the urea portion of the reaction products by the presence of from about 1 to 2.5 weight percent ammonia, when $P_2O_5$ is greater than 30 weight percent and from about 1 to 4 weight percent ammonia when $P_2O_5$ is less than 30 weight percent with an amount of less than 2.5 weight percent ammonia being preferred in both cases.

20 Claims, No Drawings

AMMONIA STABILIZED HIGH ANALYSIS LIQUID FERTILIZERS

BACKGROUND OF THE INVENTION

1. Field of the Invention

The present invention relates to high-analysis low pH liquid fertilizer compositions, prepared by reacting urea and phosphoric acid or a mixture of phosphoric acid and sulfuric acid, stabilized with small amounts of ammonia.

2. Related Art

Ammonium phosphates and polyphosphates have been prepared by neutralizing wet process phosphoric acid. Various procedures have been employed urea in the production of the ammonium phosphates to complex impurities or as condensing agents to maintain the ammonium phosphates as water soluble for use in liquid fertilizers, for example, U.S. Pat. Nos. 3,022,153 and 3,540,874.

Similarly U.S. Pat. No. 3,723,086 discloses an improved process for producing ammonium phosphates and polyphosphates by dissolving 2 to 10 percent by weight of urea in a stream of wet phosphoric acid prior to ammoniating the wet phosphoric acid. The urea serves to inhibit the formation of insoluble materials. Since wet phosphoric acid contains 15 to 20 weight percent free water, 10 weight percent urea would form a true solution. The ammoniatization is carried out at elevated temperatures, e.g., 200° F. with approximately a molar amount of ammonia.

The high analysis liquid fertilizers which are the subject of the present invention are nonammoniated. They are are the reaction product of urea and phosphoric acid or a mixture of phosphoric acid and sulfuric and are described in detail in commonly assigned U.S. Pat. No. 4,315,763 which is incorporated herein. Briefly these novel liquid fertilizers are prepared by reacting from about 0.5 to 2 moles of urea with a mole of phosphoric acid or a mixture of phosphoric acid and from 5 to 80 weight percent sulfuric acid, in an exothermic reaction in the presence of less water than required to form aqueous solutions of the reaction products (i.e., urea phosphate and sulfate).

The reaction products are liquids which do not salt out at 0° C. and which have pH of less than 4.

Although these compositions are stable, that is, they do not salt out or decompose rapidly, they do tend to suffer during storage from a decomposition of the urea portion of the composition, with a loss of acidity. As has been demonstrated, for example, in the U.S. Pat. No. 4,315,763, the acidity of the fertilizer, (hence the soil) greatly affects nitrogen loss from soil, i.e., nitrogen loss can be directly related to increasing pH. Thus it is highly advantageous to maintain the low pH which is obtained for the novel liquid fertilizer during even long periods of storage.

It is an advantage of the present invention that the high acidity of the described high analysis, nonammoniated, liquid fertilizer is maintained for longer periods of time. If is a further advantage that the decomposition of the urea phosphate and/or sulfates is inhibited. It is a particular advantage that the inhibitor is completely compatible in the compositions and in agricultural purposes. It is a further advantage that inhibiting can be obtained by addition of the inhibitor after the liquid fertilizers are manufactured. These and other advantages and features will become apparent from the following description.

SUMMARY OF THE INVENTION

Briefly the present invention is in a high analysis, nonammoniated, liquid fertilizer which is the reaction product of urea and phosphoric acid or a mixture of phosphoric acid and sulfuric acid and characterized as a clear liquid, which does not salt out at 0° C., has a pH of less than 4 and has an analysis of N, $P_2O_5$ and $K_2O$ totaling at least 25 wt. percent of the fertilizer in the ranges of $>0$ to 30 wt. % N, 5 to 50 wt. % $P_2O_5$ and 0 to 12 wt. % $K_2O$ wherein the improvement is presence of from about 1 to 2.5 weight percent ammonia therein when the weight percent of $P_2O_5$ is greater than about 30 and from about 1 to 4 weight percent ammonia therein when the weight percent of $P_2O_5$ is less than about 30.

The addition of this small amount of ammonia to the liquid fertilizer does not adversely affect the pH, that is, the pH remains below 4 upon ammonia addition and continues to maintain the low pH, i.e. below 4 during storage, whereas the uninhibited fertilizers begin to show a rise in pH and decomposition of the urea after about 2 to 20 days, depending on storage temperature conditions.

DETAILED DESCRIPTION OF THE INVENTION

The ammonia may be added to the fertilizer at any time after the fertilizer has been prepared, even after the fertilizer has been in storage and the benefits of the present invention will be obtained. The ammonia may also be added during the fertilizer preparation, usually as the last component in the preparation after the exotherm has been reached and the urea-phosphoric acid reaction mixture is cooling. When the ammonia is added prior to the reaction of urea and phosphoric acid, special attention must be paid to maintaining the temperature of the reaction mixture, preferably below 140° F. in order to avoid decomposition of the urea since the ammonia adds to the exothermic reaction.

The ammonia may be added as gaseous ammonia or as ammonium hydroxide (ahydrous or aqueous solution). The presence of the phosphate $P_2O_5$ determines the maximum amount of ammonia that can be present. Small amounts of water are present in the present fertilizers as a processing aid or impurity in the reactants. The urea phosphate which is formed is more soluble in the water and will cause less soluble monoammonia phosphate to precipitate. Any precipitation in the liquid fertilizers is unacceptable, hence preferably the least amount of ammonia which will stabilize the urea is preferably employed within the ranges specified.

It has been determined that the $P_2O_5$ weight percent of about 30 is the break point. Liquid fertilizers with less than about 30 weight percent $P_2O_5$ can tolerate slightly more ammonia, i.e., up to about 4 weight percent before the monoammonium phosphate begins to precipitate, whereas those above about 30 weight percent $P_2O_5$ can tolerate only about 2.5 weight percent ammonia. A preferred range of ammonia concentration is about 1 to less than 2.5 for all compositions since greater amounts of ammonia tend to increase the pH of the fertilizer and lower pH's, i.e., less than pH 2 are preferred for fertilizer stability in the ground.

It is believed that the presence of ammonia inhibits the hydrolysis of urea in the equation:

$$CO(NH_2)_2 + 2H_2O \rightleftharpoons [CO(OH)_2] + 2NH_3$$

and thus stabilizes the liquid fertilizers.

The decomposition of the urea portion of the composition results in a pH rise and the formation of pressure in the storage containers and ultimately precipitation of ammonium phosphates occur.

The liquid fertilizers of the present invention may be further characterized as having total N, $P_2O_5$ and $K_2O$ analysis of at least 25 weight % and preferably greater than 30 weight % of the fertilizer. It should be appreciated that only N and $P_2O_5$ may be present in some compositions and that the total analysis characterizing the composition is based on these two components, $K_2O$ being 0 and the N being greater than 0. The liquid fertilizer inventions are clear liquids, stable against crystallizing at 0° C. That is, the liquid fertilizers of the present invention do not salt out at 0° C. Generally, up to 2 moles of urea per mole of 75% phosphoric acid may be employed without dilution water. When sulfuric acid is present in addition to phosphoric, up to about 3 moles of urea may be added (depending on the amount of sulfuric acid present, since up to 3 moles of urea will combine with concentrated (93%) sulfuric acid alone to form 0° C. stable liquids). The amount of urea used is that required to obtain the mole ratio or analysis desired; e.g., if one mole of urea per mole of 75% $H_3PO_4$ is used, the product contains 14.7% N, 37% $P_2O_5$ and 0% $K_2O$ (14.7-37-0). For grades of commercial significance, usually at least one mole of urea per mole of acid, e.g., phosphoric acid, would be used.

Basically, the liquid fertilizers are high analysis liquid fertilizers comprising the reaction product of urea and phosphoric acid, having a pH less than 4, preferably less than 2 and generally from about 1.5 to 2.0. Specifically, the liquid fertilizers are the reaction product of urea and phosphoric acid or a mixture of phosphoric and sulfuric acid, have a pH of less than 4; and are clear liquids. Potash may be incorporated in these liquids, giving clear liquids which have an analysis of N, $P_2O_5$ and $K_2O$ totaling at least 25 weight percent of the fertilizer in the ranges of greater than 0 to 30 wt.% N, preferably about 0.1 to 30 wt. % N; 5 to 50 wt. % $P_2O_5$ when the usual 75% phosphoric acid (54% $P_2O_5$) is used, and 0 to 12 wt. % $K_2O$.

This method of liquid fertilizer preparation is particularly well adapted to the utilization of commercial grades of phosphoric acid and/or urea. The acids are frequently contaminated with trace metals, for example, iron, which can be a useful component of the fertilizer. However, in other liquid fertilizers presently in wide use, these trace elements precipitate out of solution because the liquids are neutral or basic in nature. The liquid fertilizers of the present invention are highly acidic nonammoniated liquid fertilizers, rendering trace elements more soluble.

This benefit applies not only to those trace metals which occur naturally in the phosphoric acid, but also to metal salts which may be added to the finished fertilizer such as zinc, manganese, aluminum or iron sulfates or chlorides.

Agricultural potash, potassium chloride, (other potassium salts such as potassium carbonate may be used also) is soluble in reasonable proportions, i.e., up to about 20 weight percent in weight percent in water at 0° C.; however, the so-called super concentrations of potash are obtained by suspending the potash beyond its solubility limits in a finely divided form with the adi of gelling materials (viscosifying agents) such as clays (montmorillonite, bentonite) heteropolysaccharides, natural gums and the like. The gelling material is present in a viscosifying amount sufficient to suspend finely divided solid particles, e.g., 50 to 1000 microns. When this is done, suspensions containing 50% of combined nutrients can readily be made, with ranges of 5 to 15% N, 5 to 25% $P_2O_5$ and 12 to 30% $K_2O$ by weight.

The reaction of phosphoric acid and urea is exothermic; however, it proceeds at a rather slow rate. This reaction rate can be increased and sulfur can be added to the fertilizer composition by employing mixtures of phosphoric acid and sulphuric acid; preferably from 5 up to about 80 weight percent of the total acid content may be sulfuric acid, more preferably up to about 50 weight percent.

The reaction of urea and phosphoric acid may be conducted in dilute aqueous solutions; in fact, this method has been used in the prior art, as noted above in British Patent Specification No. 1,149,924. However, use of water solutions is detrimental to the salt out stability of the system and of course, the presence of water in the fertilizer compositions reduces the nutrient content. In the present fertilizer, some water will normally be present in phosphoric acid (10-15% usually), some as a result of the hydroscopic nature of urea (0-5%) and some water (up to 40% of the weight of urea) may be added as a processing aid to slurry the urea and expedite the contact of urea and the acid; the amount of water present during the reaction between urea and phosphoric acid is thus limited. This limitation increases the total nutrient content of the fertilizer compositions of this invention, and is a factor in their stability. Further, this limitation of water is in stark contrast to prior art methods, in which urea is reacted as a solution in water.

Urea enters the system as a solid or at most a heavy slurry, with far less water than is required to solubilize it. The water present, if any, in the present compositions is less than that required to form aqueous solutions of the reaction products. Thus, water is not the solvent for the present liquid compositions, although water may be present as described above, i.e., as a contaminant or processing aid. Among these influences, it is found that urea phosphate does not crystalline from these compositions even though they far exceed the normal solubility of the urea phosphate.

To prevent the crystallization of urea phosphate from concentrated acid solutions, the reaction should be conducted at the lowest temperature consistent with acceptable reaction rate (100° F. or less), (exothermic and cooled as necessary). If sulfuric acid is used in the formula, temperature can be allowed to rise substantially (up to 180° F.); as little as 10-20% sulfuric acid in the formula will prevent urea phosphate crystallization completely. Limiting the water content of the system as explained above, in combination with low temperature reaction, further inhibits crystallization; if a particular formula calls for additional water (as with compositions high in $K_2O$) sulfuric acid is again useful to prevent crystal formation. An additional variable is the source of the phosphoric acid; furnace grade acid forms crystals more readily than wet process acids, probably because the latter contain less water, some free sulfuric acid, or other contaminants (these acids differ among themselves). With due attention given these factors, any acid formation above 25% combined nutrient (N+$P_2O_5$+$K_2O$), can be made as a stable liquid.

The term "stable against salting out at 0° C." means that substantially no precipitation of materials occurs in the liquid fertilizers at 0° C.

The term "viscosifying amount" means that amount of a material, i.e., a viscosifying agent which will increase the viscosity of liquid in question to a degree sufficient to achieve the desired result, i.e., suspend fine insoluble particles.

The reaction between reagent grade urea and food grade phosphoric acid, 75% can be conducted to give products of analysis up to 22-28-0 (N-P-K). This is accomplished without added water, by simply stirring the mixture of urea and acid. Heating is mild, the solutions are viscous and the reactions slow, requiring up to several hours in small batches to reach completion at high N values. If it is desired to increase the ratio of N to P, maintaining good low temperature stability, it is found this can be done by reducing the P level by dilution, e.g., using water as the diluent.

In the process of preparing these compositions, it has been found that where the ratio of nitrogen to $P_2O_5$ by weight is 0.6:1 or greater, the phosphoric acid should advantageously be added directly to the urea. Preferably, the urea has been dampened or slurried with water prior to acid addition. However, where the weight ratio of nitrogen to $P_2O_5$ is less than 0.6:1, the urea may be added directly to the phosphoric acid. This weight ratio corresponds to a mole ratio of urea to phosphoric acid of 1.5:1.

The procedure of adding the phosphoric acid to the urea when the weight ratio of N:$P_2O_5$ is 0.6:1 or greater avoids crystallization or salting out that would normally result.

N-P solutions with sulfur can be made by blending urea-sulfuric acid (USA) with phosphoric acid (PA). These solutions are completely miscible in all proportions, and of good stability if kept covered to exclude atmospheric moisture pick-up. No heating is observed in mixing, but since both liquids are viscous, some agitation is required to produce a uniform blend.

Because of the high intensity of the urea-sulfuric acid reaction, special procedures are needed to make the concentrated product on a commercial basis. If the desired product requires acid of 50% concentration or less, the urea can be slowly added to the acid with stirring. If, however, the acid is stronger than this, decomposition may result if this procedure is followed. In these cases, it is desirable to add the acid slowly to the urea while tumbling; after a fraction of the acid (20-30%, depending on concentration) has been added, a stirrable slurry is formed. Slow addition of the remainder of the acid while stirring brings the system to complete reaction.

Once a batch of liquid product has been made, it can be used as a base for further manufacture. This is done by placing the liquid in a stirred vessel of appropriate size, adding urea in sufficient quantity to double the size of the finished batch, adding any water required for the formulation, and slowly adding the sulfuric acid while stirring. Leaving a heel of liquid in the vessel permits further manufacture to be conducted in a stirred fluid mass.

N-P solutions with sulfur can also be made by combining urea, sulfuric acid and phosphoric acid directly. To do this, the two acids are measured, combined and mixed; some heat generation accompanies this operation. The urea is then added, with stirring; here the heat release is appreciable, depending on the proportion of sulfuric acid in the mix (higher sulfuric acid content generating more heat). Reaction is rather rapid, generally being complete in 15-20 minutes, again somewhat depending on the proportion of sulfuric acid present. By this method it is possible to combine more urea and phosphoric acid in the product with a given amount of sulfuric acid than can be done by blending phosphoric with pre-reacted ureasulfuric acid.

Turning now to the use of field grade materials; in the preparation of these compounds, certain limitations arise due to the condition of the urea and/or the composition of the phosphoric acid.

Field grade phosphoric acid generally contains some free sulfuric acid, some dissolved or suspended metal salts, and some organic residues or carbon. While Food Grade acid of the same strength is water-white, with a specific gravity of 1.574 and a viscosity less than 100 cp at 70° F., field acids are highly colored (green, brown or black), with specific gravities ranging from about 1.65 to 1.95 and viscosities are highly colored (green, brown or black), with specific gravities ranging from about 1.65 to 1.95 and viscosities are high as 1000 cp. The high values of viscosity and specific gravity indicate the presence of metal salts and sulfuric acid, with correspondingly reduced water content. As a consequence of these compositional variations, some difference in behavior must be expected when making compounds described above using field acids.

The following examples are intended to illustrate the invention and not to limit its scope.

EXAMPLES 1-4

These examples illustrate the amount of ammonia which can be added to a 10-34-0 liquid fertilizer (N-$P_2O_5$-K). The amount of urea in the formulation was adjusted to allow for nitrogen from ammonia, if any, in the formulation. A small amount of processing water was placed in the reactor, to which was added the phosphoric acid followed by urea with moderate stirring. Mild heat evolved. After the reaction was completed (about 15 minutes) the ammonia was added as a concentrated solution of ammonium hydroxide (N=24%) with continued stirring. The temperature of the system was less than 100° F.

After the formulation was completed, the liquid fertilizers were cooled to ambient temperatures (80°-90° F.) and stored in glass containers for observation.

The reactants and results are reported in Table I.

TABLE I

| EXAMPLE | 1 | 2 | 3 | 4 |
| --- | --- | --- | --- | --- |
| Component | | | | |
| Water (wt. %) | 15.30 | 13.31 | 11.32 | 9.33 |
| Phosphoric Acid (wt. %) (54% $P_2O_5$) | 62.96 | 62.96 | 62.96 | 62.96 |
| Urea (Wt. %) | 21.74 | 19.57 | 17.39 | 15.22 |
| Aqua Ammonia (Wt. %) (24% Nitrogen) | 0 | 4.16 | 8.33 | 12.49 |
| Wt. % $NH_3$ added | 0 | 1.2 | 2.4 | 3.6 |
| Wt. % N from Ammonia | 0 | 1 | 2 | 3 |
| Approximate pH | 1.4 | 1.8 | 2 | 2.2 |
| Number of days for Precipitate to form | 20 | I* | I | 2** |

*I = Indefinite
** = mono ammonium phosphate crystals formed.

EXAMPLES 5-9

These examples illustrate the amount of ammonia that can be added to a 7-28-0 liquid fertilizer using the same procedure as Examples 1-4.

The reactants and results are reported in Table II.

TABLE II

| EXAMPLE | 5 | 6 | 7 | 8 | 9 |
|---|---|---|---|---|---|
| Component | | | | | |
| Water (wt. %) | 32.93 | 30.95 | 28.95 | 26.92 | 24.95 |
| Phosphoric Acid (wt. %) (54% $P_2O_4$) | 51.85 | 51.85 | 51.85 | 51.89 | 51.89 |
| Urea (wt. %) | 15.22 | 13.04 | 10.87 | 8.70 | 6.52 |
| Aqua Ammonia (wt. %) (24% N) | 0 | 4.16 | 8.33 | 12.49 | 16.64 |
| Wt. % $NH_3$ added | 0 | 1.2 | 2.4 | 3.6 | 4.8 |
| Wt. % N from Ammonia | 0 | 1 | 2 | 3 | 4 |
| Approximate pH | 1.1 | 1.7 | 2.0 | 2.5 | 2.7 |
| Number of days for precipitation to form | 20 | I* | I | I | 2** |

*I = Indefinite
** = Mono ammonium phosphate crystals formed

The invention claimed is:

1. In a high analysis, non-ammoniated, liquid fertilizer composition which is the reaction product of urea and phosphoric acid, or a mixture of phosphoric acid and sulfuric acid, and characterized as a clear liquid, which does not salt out at 0° C., has a pH of less than 4 and has an analysis of N, $P_2O_5$ and $K_2O$ totaling at least 25 weight percent of the fertilizer in the ranges of >0 to 30 wt. % N, 5 to 50 wt. % $P_2O_5$ and to 12 wt. % $K_2O$ wherein the improvement is the presence of from about 1 to 2.5 weight percent ammonia therein when the weight percent of $P_2O_5$ is greater than about 30 and from about 1 to 4 weight percent ammonia therein when the weight percent of $P_2O_5$ is less than about 30 whereby the pH of said liquid fertilizer is stabilized.

2. The high analysis, liquid fertilizer according to claim 1 wherein the reaction product is that of urea and phosphoric acid.

3. The high analysis, liquid fertilizer according to claim 1 wherein the reaction product is that of urea and a mixture of phosphoric acid and sulfuric acid.

4. The high analysis, liquid fertilizer according to claim 1 wherein the total N, $P_2O_5$ and $K_2O$ analysis is at least 30 weight % of the fertilizer.

5. The high analysis liquid fertilizer according to claim 1 having a pH in the range of 1.5 to 4.

6. The fertilizer composition according to claim 5 wherein a potassium containing component is present.

7. The fertilizer composition according to claim 6 wherein potassium chloride is present.

8. The fertilizer composition according to claim 1 wherein a viscosifying amount of gelling material is additionally present for suspending finely divided solid particles.

9. The fertilizer composition according to claim 8 containing trace metals.

10. The fertilizer composition according to claim 1 containing trace metals.

11. The fertilizer composition according to claim 10 wherein the trace metals include one or more of the metals zinc, manganese, aluminum or iron.

12. The fertilizer composition according to claim 1 wherein the amount of ammonia present is less than 2.5 weight percent.

13. The fertilizer composition according to claim 12 wherein said pH is less than 2.

14. A high analysis, non-ammoniated, liquid fertilizer having stabilized pH comprising the reaction product of urea and phosphoric acid or a mixture of phosphoric acid and sulfuric acid, characterized as a clear liquid which does not salt out at 0° C., has a pH of less than 4, has an analysis of N, $P_2O_5$ and $K_2O$ totaling at least 25 weight percent of the fertilizer in the ranges of >0 to 30 wt. % N, 5 to 50 wt. % $P_2O_5$ and 0 to 12 wt. % $K_2O$ and contains from about 1 to 2.5 weight percent ammonia when the weight percent of $P_2O_5$ is greater than about 30 and from about 1 to 4 weight percent ammonia when the weight percent of $P_2O_5$ is less than about 30.

15. The liquid fertilizer according to claim 14 wherein the amount of ammonia present is less than 2.5 weight percent.

16. The liquid fertilizer according to claim 15 wherein said pH is less than 2.

17. The liquid fertilizer according to claim 14 wherein the reaction product is that of urea and phosphoric acid.

18. The liquid fertilizer according to claim 14 wherein the reaction product is that of urea and a mixture of phosphoric acid and sulfuric acid.

19. The liquid fertilizer according to claim 17 wherein a potassium containing component is present.

20. The liquid fertilizer according to claim 18 wherein a potassium containing component is present.